(No Model.) 3 Sheets—Sheet 1.
P. C. BROWN & T. P. BRAGG.
CULTIVATOR.
No. 330,467. Patented Nov. 17, 1885.
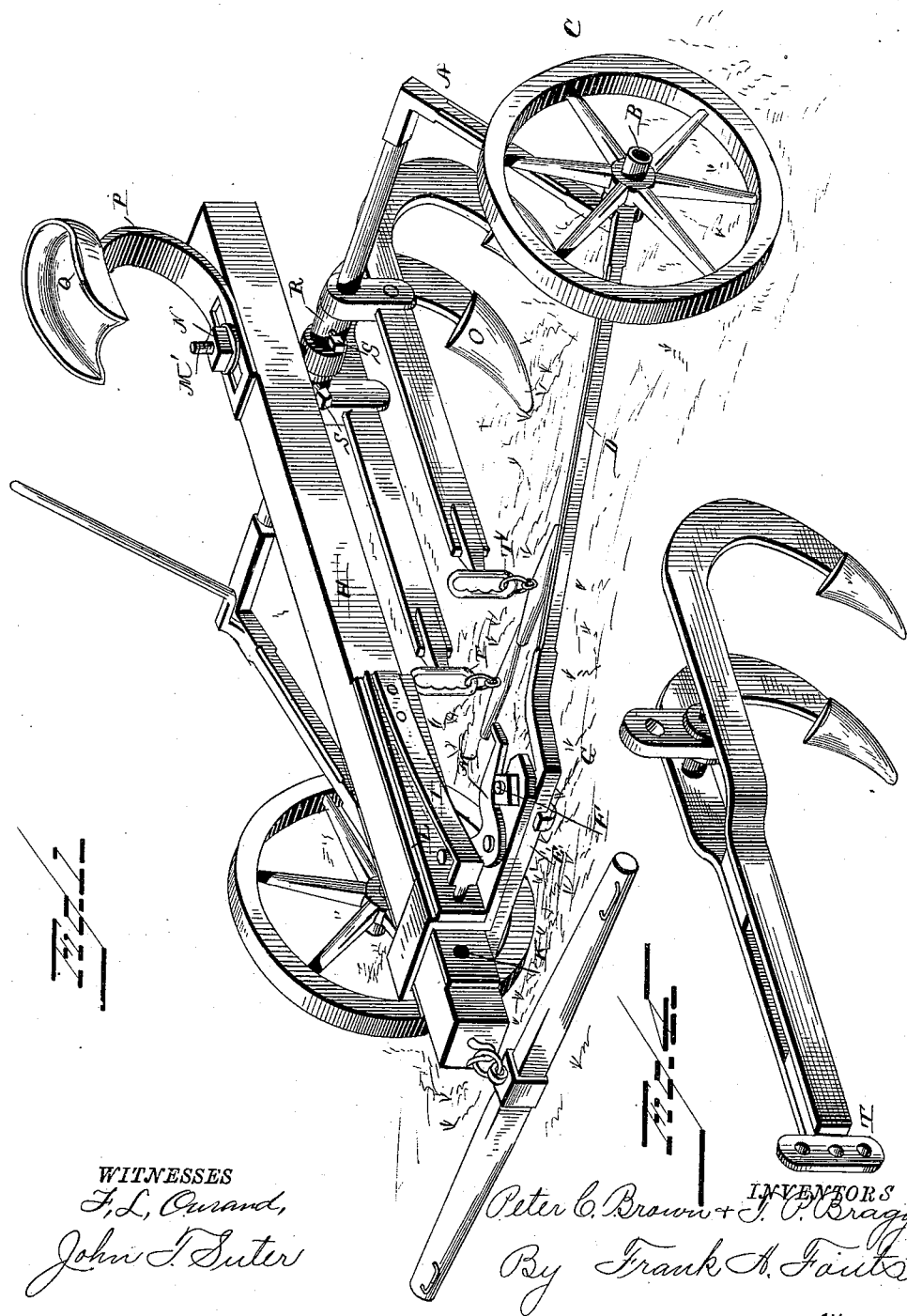
WITNESSES
F. L. Ourand,
John T. Suter
INVENTORS
Peter C. Brown + T. P. Bragg
By Frank A. Fauts
Attorney (No Model.) 3 Sheets—Sheet 2.
P. C. BROWN & T. P. BRAGG.
CULTIVATOR.
No. 330,467. Patented Nov. 17, 1885.
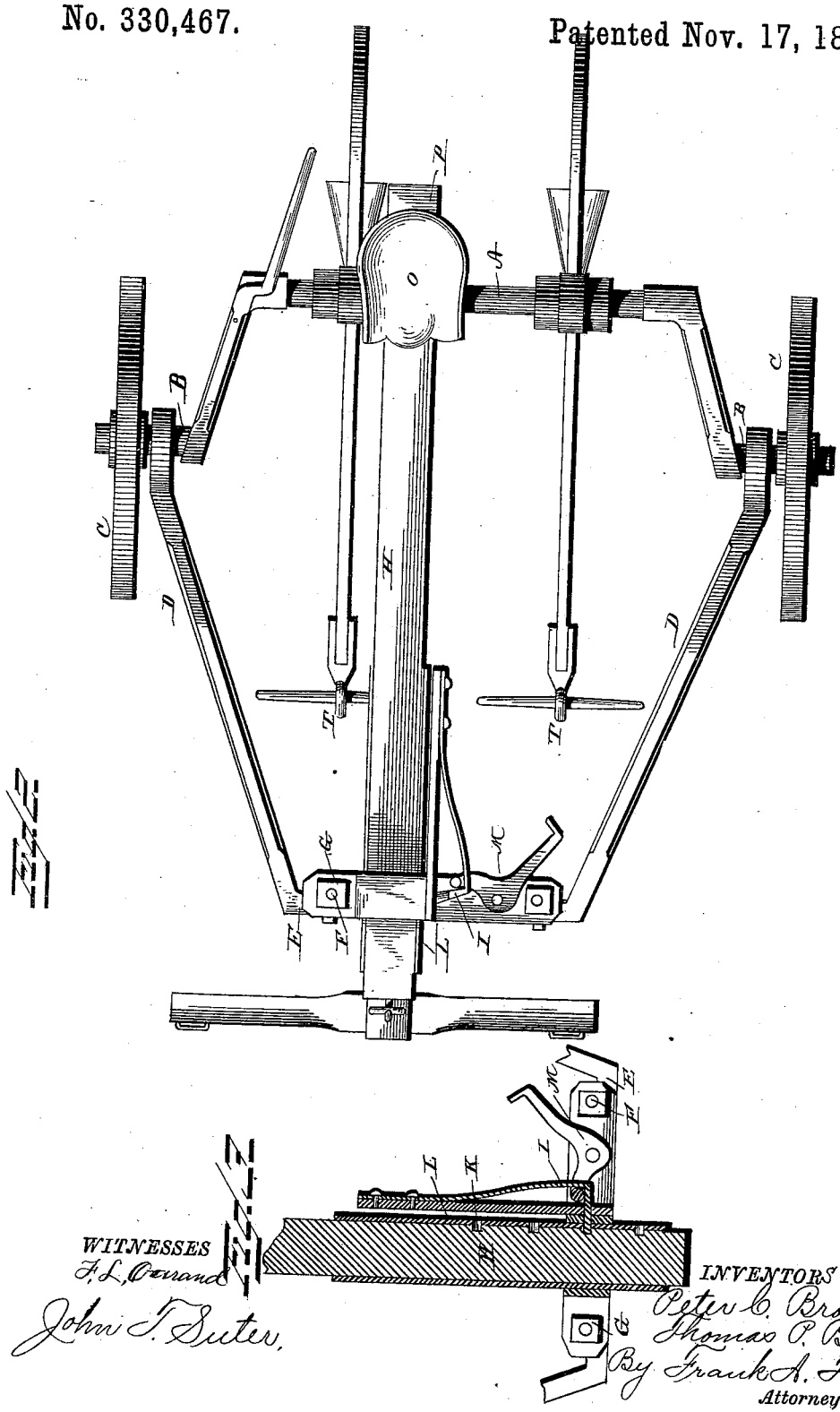

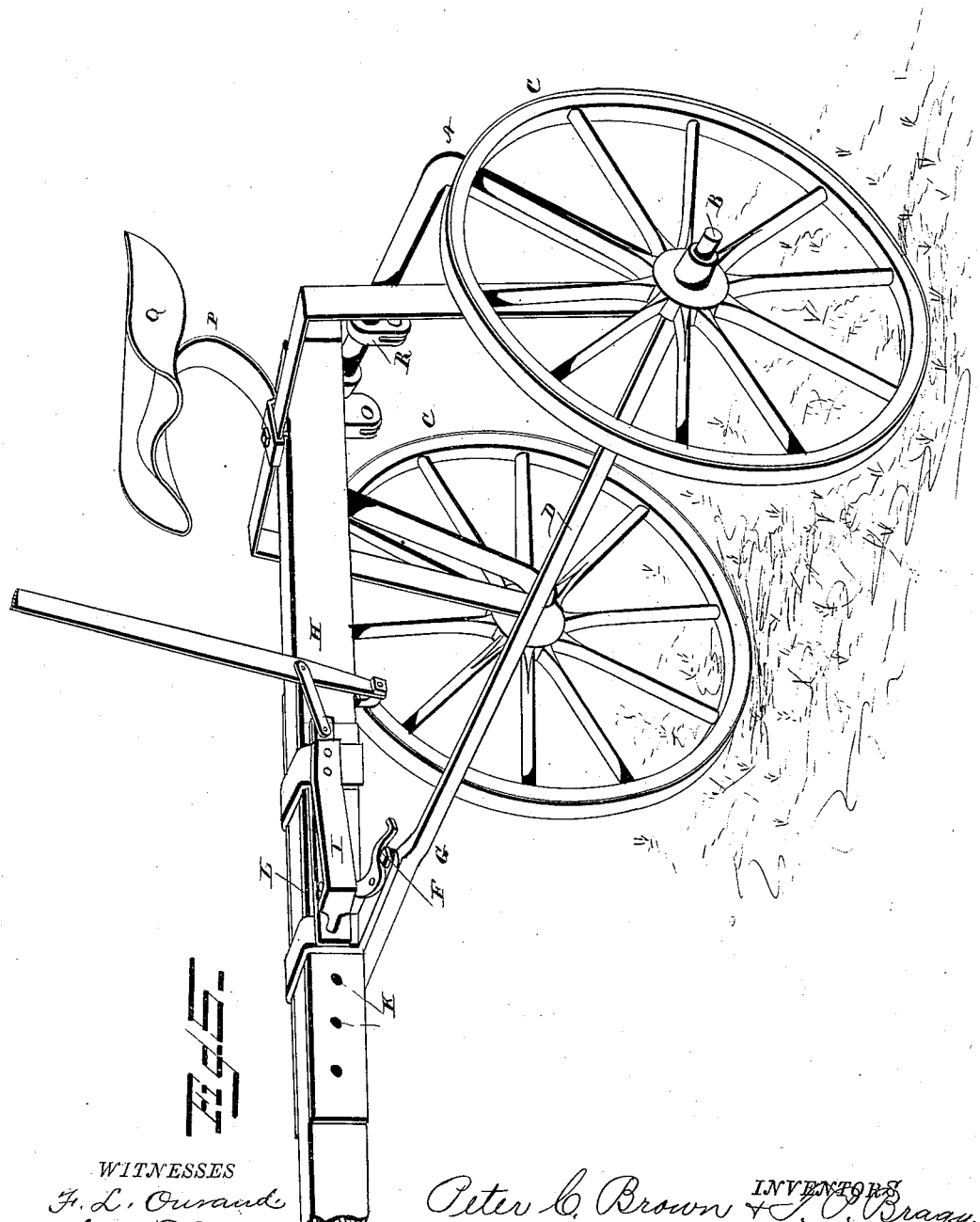

UNITED STATES PATENT OFFICE.

PETER C. BROWN AND THOMAS P. BRAGG, OF ENNIS, TEXAS.

CULTIVATOR.

SPECIFICATION forming part of Letters Patent No. 330,467, dated November 17, 1885.

Application filed August 19, 1885. Serial No. 174,801. (No model.)

*To all whom it may concern:*

Be it known that we, PETER C. BROWN and THOMAS P. BRAGG, citizens of the United States, residing at Ennis, in the county of Ellis and State of Texas, have invented certain new and useful Improvements in Cultivators, of which the following is a specification, reference being had therein to the accompanying drawings.

This invention relates to certain improvements in sulky plows or cultivators; and it has for its objects to provide for elevating and lowering the plows in a novel and convenient manner, and for adjusting the seat to suit the driver or plowman, and to provide certain other details in the construction of the cultivator, as will be more fully hereinafter set forth.

The above-mentioned objects we attain by the means illustrated in the accompanying drawings, in which—

Figure 1 represents a perspective view of our improved cultivator entire. Fig. 2 represents a top view thereof; Fig. 3, a transverse horizontal section taken on the line *x x* of Fig. 1; Fig. 4, a detached perspective view of a modification, showing one of the plow-beams and plows to be employed when it is desired to use the cultivator as a gang-plow; and Fig. 5, a perspective view of a modification of our cultivator, in which the sliding sleeve is operated directly by a lever fulcrumed to the tongue H.

The letter A indicates the axle of the cultivator, which is bent at right angles at each end, and provided with journals B, upon which the wheels C are mounted. To the journals of said axle, just inside of the hubs of the wheels, are loosely connected or pivoted the rear ends of the hounds D, which extend forward and are connected by means of a cross-beam, E. To the said cross-beam is secured a metallic strap or band by means of the eye-bolts F and nuts G, and through said strap or band passes the tongue H, which is adjustably held therein for the purpose of elevating or lowering the axle and holding it in position, as more fully hereinafter described. The strap or band at one side is provided with a rearwardly-extending arm, which has a spring lock-bolt, I, firmly bolted or otherwise secured to its rear end, the bolt passing through an aperture in the side of the band, so as to interlock into one of a series of apertures, K, in a lock-plate, L, secured to one side of the tongue.

The letter M indicates a lever pivoted or fulcrumed to one of the side extensions of the strap or band, the short arm of said lever being provided with a vertical pin, which engages the inside of the spring-bolt, the longer arm of said lever being provided with a foot-rest, by means of which it can be operated by the foot of the driver or plowman, so as to release the bolt and permit the parts to be shifted to elevate or lower the parts of the cultivator.

The tongue, at its rear, is loosely connected to the bent axle by means of an eyebolt, M', and nut N, which also adjustably secure the slotted spring-support P of the seat Q, so that it can be moved back or forth to accommodate the driver or plowman. The tongue is adjusted laterally by means of the collars R and set-screws S, so as to be accommodated to the positions of the plows.

In Figs. 1 and 2 of the drawings a single subsoil-plow is shown secured to the axle, and the axle is shown in a position about at an angle of forty-five degrees to the horizontal line; but by projecting the tongue forward the bent axle may be held in any position between such angle and a vertical position, in order to enable the cultivator to be elevated to any proper extent above the growing grain, and to adapt it as a gang-plow the single plow-beam may be replaced with gang-plows, which may be secured at either side, when desired.

The forward ends of the plow-beams are provided with clevis attachments T, to which single-trees may be attached, so that the draft may be equalized and uniformly distributed between the animals drawing the plow.

Having thus described our invention, what we claim, and desire to secure by Letters Patent, is—

1. The combination, with the bent axle and the wheels mounted thereon, of the loosely-connected hounds, the strap at the forward ends of the same, the tongue passing through said strap and pivoted to the axle, and the spring-bolt and lever, whereby the parts of the cultivator may be elevated or lowered, substantially as and for the purposes specified, 2. The combination, with the bent axle and the wheels upon which it is mounted, of the pivoted hounds, the strap and locking devices, the tongue pivoted to the bent axle, and the adjustable seat secured to the tongue, whereby the parts may be adjusted to enable the driver or plowman to operate the cultivator, substantially as and for the purposes specified.

In testimony whereof we affix our signatures in presence of witnesses.

PETER C. BROWN.
THOMAS P. BRAGG.

Witnesses:
DAN L. MORRISON,
FRANK. W. DIXON.